US011853023B2

(12) United States Patent
Li et al.

(10) Patent No.: US 11,853,023 B2
(45) Date of Patent: Dec. 26, 2023

(54) METHOD OF CONTROLLING COAL MANAGEMENT SYSTEM FOR REDUCING COAL USAGE

(71) Applicant: TCC INFORMATION SYSTEMS CORP., Taipei (TW)

(72) Inventors: Jong-Peir Li, Taipei (TW); Mei-Chu Huang, New Taipei (TW)

(73) Assignee: TCC INFORMATION SYSTEMS CORP., Taipei (TW)

( * ) Notice: Subject to any disclaimer, the term of this patent is extended or adjusted under 35 U.S.C. 154(b) by 0 days.

(21) Appl. No.: 17/409,766

(22) Filed: Aug. 23, 2021

(65) Prior Publication Data

US 2022/0147002 A1 May 12, 2022

Related U.S. Application Data

(60) Provisional application No. 63/112,167, filed on Nov. 11, 2020.

(30) Foreign Application Priority Data

Nov. 16, 2020 (TW) ................................. 109139849

(51) Int. Cl.
G05B 19/042 (2006.01)
(52) U.S. Cl.
CPC .... G05B 19/042 (2013.01); *G05B 2219/2639* (2013.01)
(58) Field of Classification Search
None
See application file for complete search history.

(56) References Cited

U.S. PATENT DOCUMENTS

| 5,181,482 A * | 1/1993 | Labbe | F22B 37/56 |
| | | | 702/182 |
| 6,438,430 B1 * | 8/2002 | Martin | G05B 17/02 |
| | | | 700/28 |
| 6,736,089 B1 * | 5/2004 | Lefebvre | F28G 1/16 |
| | | | 122/390 |
| 6,790,264 B2 | 9/2004 | Minkara | |

(Continued)

FOREIGN PATENT DOCUMENTS

| CN | 1318529 A | 10/2001 |
| CN | 1384075 A | 12/2002 |

(Continued)

*Primary Examiner* — Jason Lin
(74) *Attorney, Agent, or Firm* — Winston Hsu

(57) ABSTRACT

A coal management system includes a central control system and a plurality of monitoring points. The plurality of monitoring points are arranged at a plurality of pieces of production equipment. A method of controlling the coal management system includes the plurality of monitoring points acquiring monitoring data, the central control system selecting a candidate feature set and constructing a coal model according to the monitoring data, the central control system generating an operation recommendation of a controlled monitoring point of the plurality of monitoring points according to the coal model, and a piece of production equipment performing an operation according to the operation recommendation to achieve a target operation condition.

3 Claims, 4 Drawing Sheets

(56) References Cited

U.S. PATENT DOCUMENTS

| | | | | |
|---|---|---|---|---|
| 7,584,024 B2* | 9/2009 | Wroblewski | ......... | G05B 13/027 |
| | | | | 700/36 |
| 7,966,080 B2* | 6/2011 | Jia | ......... | G05B 13/048 |
| | | | | 700/274 |
| 9,671,183 B2* | 6/2017 | Jones | ......... | F22B 37/52 |
| 9,927,231 B2* | 3/2018 | Carlier | ......... | G01B 17/025 |
| 10,337,348 B2* | 7/2019 | Desabhatla | ......... | G05B 15/02 |
| 11,232,376 B2* | 1/2022 | Na | ......... | G05B 13/048 |
| 2003/0195641 A1* | 10/2003 | Wojsznis | ......... | G05B 11/42 |
| | | | | 700/42 |
| 2004/0249480 A1* | 12/2004 | Lefebvre | ......... | G06K 9/6271 |
| | | | | 700/52 |
| 2005/0282285 A1 | 12/2005 | Radhamohan | | |
| 2007/0184394 A1 | 8/2007 | Comrie | | |
| 2010/0000450 A1* | 1/2010 | Bilirgen | ......... | F23K 1/00 |
| | | | | 110/106 |
| 2012/0174830 A1 | 7/2012 | Comrie | | |

FOREIGN PATENT DOCUMENTS

| | | | |
|---|---|---|---|
| CN | 101560070 A | | 10/2009 |
| CN | 101048709 B | | 7/2010 |
| CN | 203131805 U | * | 8/2013 |
| CN | 103030313 B | | 7/2014 |
| CN | 103092171 B | | 6/2015 |
| CN | 104992298 A | | 10/2015 |
| CN | 103977705 B | | 5/2016 |
| CN | 103922621 B | | 9/2016 |
| CN | 106155026 A | | 11/2016 |
| CN | 106746786 A | | 5/2017 |
| CN | 106991507 A | | 7/2017 |
| CN | 104636815 B | | 11/2017 |
| CN | 107526292 A | | 12/2017 |
| CN | 107544288 A | | 1/2018 |
| CN | 109426144 A | | 3/2019 |
| CN | 108733849 B | | 4/2019 |
| CN | 109723556 A | | 5/2019 |
| CN | 109766666 A | | 5/2019 |
| CN | 109033511 B | | 6/2019 |
| CN | 110252132 A | | 9/2019 |
| CN | 110263395 A | | 9/2019 |
| CN | 110618706 A | | 12/2019 |
| CN | 110975597 A | | 4/2020 |
| CN | 111665711 A | | 9/2020 |
| JP | 3-238024 A | | 10/1991 |
| JP | 2012-128800 A | | 7/2012 |
| TW | I620908 B | | 4/2018 |
| WO | 2017/072047 A1 | | 5/2017 |

* cited by examiner

METHOD OF CONTROLLING COAL MANAGEMENT SYSTEM FOR REDUCING COAL USAGE

CROSS REFERENCE TO RELATED APPLICATIONS

This non-provisional application claims priority of U.S. provisional application No. 63/112,167, file on 11 Nov. 2020, and priority of Taiwan patent application No. 109139849, filed on 16 Nov. 2020, included herein by reference in its entirety.

BACKGROUND OF THE INVENTION

1. Field of the Invention

The invention relates to coal control, and in particular, to a method of controlling a coal management system for reducing coal usage.

2. Description of the Prior Art

Cement production uses coal, and excessive coal usage will increase manufacturing costs and result in environmental pollution. A cement production line includes many pieces of production equipment, and each production line has nearly 5,000 monitoring points. While these monitoring points may provide monitoring data of a kiln condition, the large number of monitoring points has made it difficult for an operator to quickly and decisively determine the kiln condition using the monitoring data of all the monitoring points. As a result, adjustments to the production equipment are time-consuming, unresponsive and inaccurate, being ineffective to reduce the coal consumption.

SUMMARY OF THE INVENTION

According to an embodiment of the invention, a coal management system includes a central control system and a plurality of monitoring points. The plurality of monitoring points are disposed at a plurality of pieces of production equipment. The method of controlling the coal management system includes the plurality of monitoring points acquiring monitoring data, the central control system selecting a candidate feature set and constructing a coal model according to the monitoring data, the central control system generating an operation recommendation of a controlled monitoring point of the plurality of monitoring points according to the coal model, and a piece of production equipment performing an operation according to the operation recommendation to achieve a target operation condition with optimal coal usage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
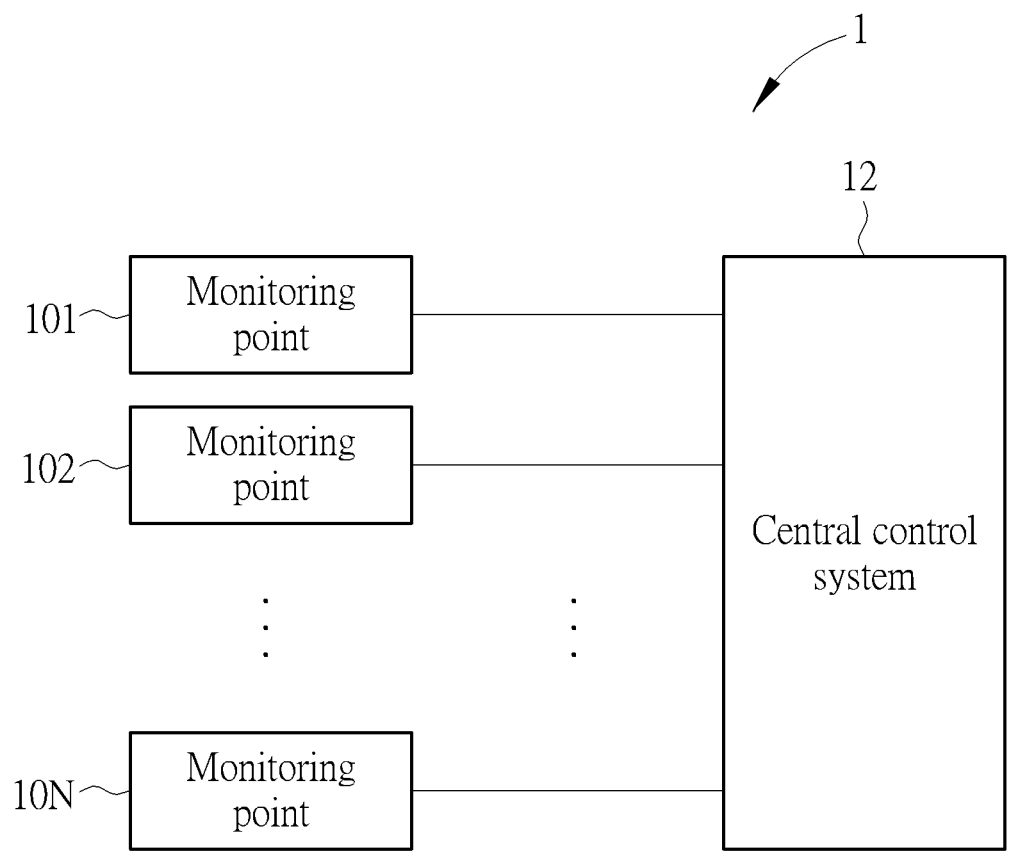
FIG. 1 is a block diagram of a coal management system according to an embodiment of the invention.

FIG. 1 is a block diagram of a coal management system 1 according to an embodiment of the invention. The coal management system 1 may be used in a cement plant to reduce coal consumption. The coal consumption may be measured by a standard coal equivalent. The coal management system 1 includes monitoring points 101 to 10N and a central control system 12, N being a positive integer greater than 1. The central control system 12 may be operated on a computer or a computer network. The monitoring points 101 to 10N may be disposed at a plurality of pieces of production equipment in the cement plant to measure monitoring data of the production equipment, and may be coupled to the central control system 12 via a wired or wireless connection. The central control system 12 may be installed in the cement plant or a remote computer room, and at least one monitoring point may be disposed at each piece of production equipment. The monitoring points 101 to 10N may send the monitoring data to the central control system 12. The central control system 12 may store the monitoring data in the database, generate operation recommendations of the plurality of pieces of production equipment according to the monitoring data, and feed the operation recommendations back to the cement plant to operate the plurality of pieces of production equipment according to the operation recommendations, thereby achieving a reduction in coal consumption and carbon emission while maintaining a stable operation. The operation recommendations may be a recommended value for operating a piece of production equipment.

The plurality of pieces of production equipment in the cement plant may include a raw material feeder, a coal feeder, a preheater, a calciner, a rotary kiln, a clinker cooler, a hot air fan, cold air fan, a kiln head hood, a kiln head exhaust fan and other pieces of production equipment. The coal feeder feeds the pulverized coal into the rotary kiln and the calciner at a kiln tail for combustion, and a hot air flow may carry the raw materials fed from the raw material feeder into the preheater for preheating the same, and then the raw materials are fed into the calciner, pass through the rotary kiln, and are then cooled by the clinker cooler to produce cement clinker. The production of cement clinker may be affected by the temperature and the pressure at an outlet of the preheater, the temperature and the pressure at an inlet of the calciner, the speed and the temperature at the rotary kiln, the volumes of air, the temperatures of the hot air fan and the cold air fan, and the amount of coal. The monitoring points 101 to 10N may include speedometers, accelerometers, tachometers, wind meters, ammeters, voltmeters, power sensors, temperature sensors, pressure sensors, concentration analyzers, images sensors, audio sensors or other sensors. The monitoring points 101 to 10N may be classified into controllable monitoring points, uncontrollable monitoring points, environmental monitoring points, quality monitoring points, monitoring points of a structured type and monitoring points of a non-structured type. The controllable monitoring points may monitor controllable variables such as a speed, a volume of air, a current, a voltage and a power. The uncontrollable monitoring points may monitor uncontrollable variables such as a temperature and a pressure. The environmental monitoring points may monitor environmental variables such as a nitrogen oxide concentration or a carbon monoxide concentration. For example, a concentration analyzer may monitor the concentration of nitrogen oxides (NOx) and/or the concentration of carbon monoxide (CO) to ensure that the recommendations provided by a coal model do not result in the environmental degradation. The quality monitoring points may monitor quality variables such as the amount of raw materials or the amount of the cement clinker. The structural data monitoring point may monitor the variables such as a speed, a volume of air, a temperature, a pressure, a concentration, a vibration that may be tabulated. The unstructured data monitoring points may monitor variables that may not be tabulated such as a video or a sound.

The monitoring points 101 to 10N may be disposed at key monitoring positions of the production equipment to monitor the variables that affect the production of cement clinker. For example, the inlet of the calciner is a key monitoring location. The temperature and the pressure at the inlet of the calciner may reflect the states of the raw materials. Therefore, temperature sensors and pressure sensors may be installed at the inlet of the calciner to detect the temperature and the pressure at the inlet of the calciner, and the central control system 12 may generate operation recommendations for the amounts of raw materials and the coal consumption according to the temperature and the pressure at the inlet of the calciner. In some embodiments, the central control system 12 may set the operation recommendations for the amount of raw materials and the amount of coal based on empirical values, thereby reducing the coal consumption of the cement plant by 0.28% (about 7,000 metric tons). The central control system 12 may transmit the operation recommendations for the amount of raw materials and the amount of coal to the display device of the cement plant, and the operator may set the raw material feeder and the coal feeder according to the recommendations displayed on the display screen. In some embodiments, the central control system 12 may further transmit operation recommendations for the amount of raw materials and the amount of coal to the raw material feeder and the coal feeder, respectively, and the raw material feeder and the coal feeder may automatically adjust the amount of raw materials and the amount of coal according to the operation recommendations.

In addition, a tachometer and a thermometer may be installed at the rotary kiln, a pressure sensor and a thermometer may be installed at the kiln head hood, a tachometer may be installed at a kiln head exhaust fan, and current sensors and air flow meters may be installed at the hot air fan and the cold air fan, a speedometer may be installed at the clinker cooler, and other monitoring points may be set at other key monitoring positions of the production equipment. In some embodiments, the central control system 12 may construct a coal model according to the monitoring data measured by the monitoring points 101 to 10N, and generate the operation recommendations of the controllable monitoring points in the monitoring points 101 to 10N, thereby further reducing the coal consumption by 1.02% (approximately 24,000 metric tons). For example, the controllable monitoring points may be the tachometer at the rotary kiln and the air flow meter at the cold air fan. The central control system 12 may generate, according to the coal model, operation recommendations for the rotational speed of the rotary kiln and the air volume supplied by the cold air fan. The central control system 12 may transmit the operation recommendations for the rotational speed of the rotary kiln and the air volume supplied by the cold air fan to a display device of the cement plant, and an operator may set the rotary kiln and the cold air fan according to the operation recommendations displayed on the display screen. In some embodiments, the central control system 12 may also transmit the operation recommendations of the rotational speed of the rotary kiln and the air volume of the cold air fan to the rotary kiln and the cold air fan. The rotary kiln and the cold air fan may automatically adjust the rotational speed and the air volume supplied according to the operation recommendations.

In some embodiments, the central control system 12 may be defaulted to use the coal model to generate an operation recommendation, and if the operation recommendation is out of range, or if an operation hazard may occur when the production equipment operates using the operation recommendations, the central control system 12 may be switched to generate the operation recommendations according to empirical values or manually determined operation recommendations. The operation hazards may include a temperature that is out of range or a pressure that is out of range.

Figure 2:
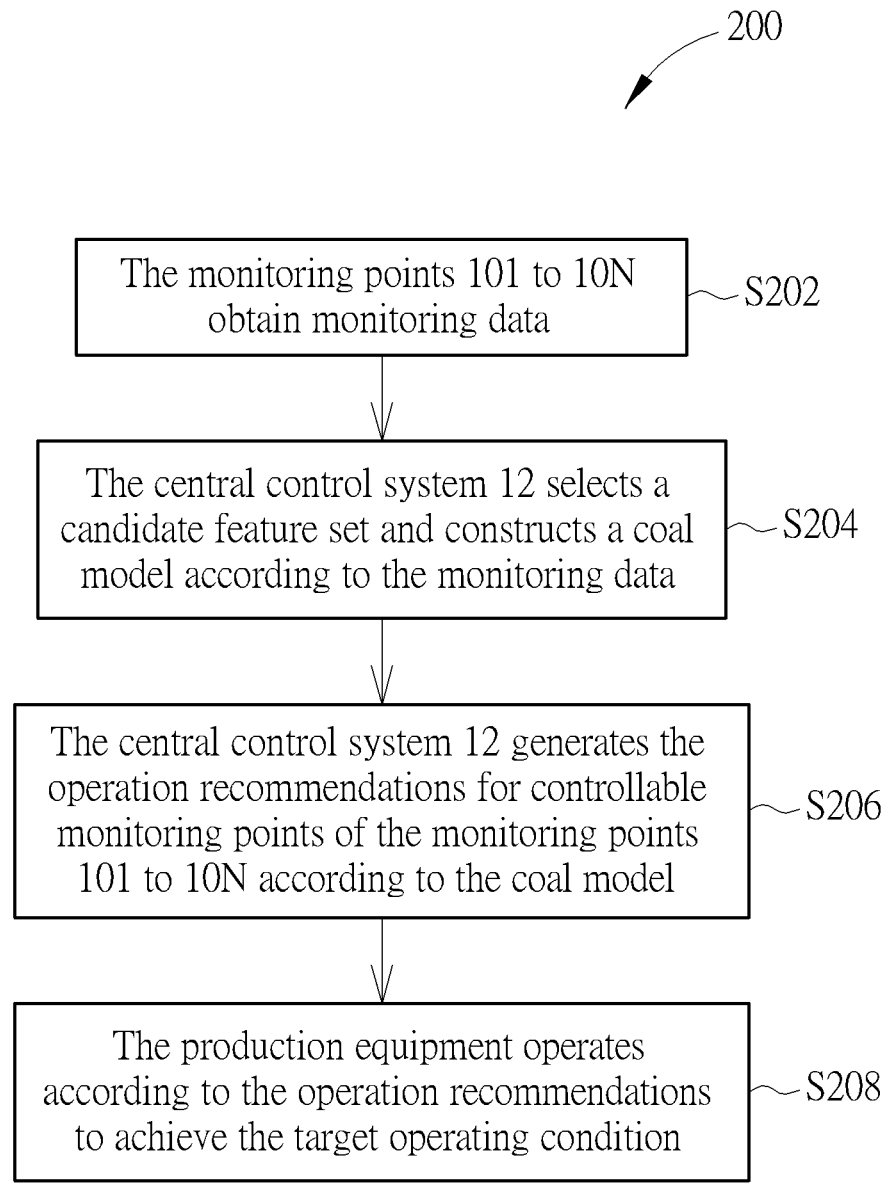
FIG. 2 is a flowchart of a method of operating the coal management system in FIG. 1.

FIG. 2 is a flowchart of a method 200 of operating the coal management system in FIG. 1. The method 200 includes Steps S202 to S208 for use to construct a coal model and using the coal model to generate operation recommendations, for the production equipment of the cement plant to achieve a target operating condition. Any reasonable step change or adjustment is within the scope of the disclosure. Steps S202 to S208 are detailed as follows:

Step S202: The monitoring points 101 to 10N obtain monitoring data;

Step S204: The central control system 12 selects a candidate feature set and constructs a coal model according to the monitoring data;

Step S206: The central control system 12 generates the operation recommendations for controllable monitoring points of the monitoring points 101 to 10N according to the coal model;

Step S208: The production equipment operates according to the operation recommendations to achieve the target operating condition.

In Step S202, the monitoring points 101 to 10N obtain, at a predetermined time interval, the monitoring data collected during the predetermined time period. The predetermined time interval may be 30 seconds or less than a second. The predetermined time period may be days, months or years. In Step S204, the central control system 12 selects a candidate feature set and constructs a coal model. The candidate feature set may include a plurality of candidate features, such as the amount of cement raw materials, the amount of cement clinker, the amount of coal consumption, the temperature at the inlet of the calciner, the rotation speed of the rotary kiln, and the air volume supplied by the cold air fan. The central control system 12 constructs the coal model using the monitoring data corresponding to the candidate features, and determines whether to update the candidate features in the candidate feature set according to a prediction error generated by the coal model. The detailed flow of Step S204 is shown in the flowchart in FIG. 3 and is explained in the subsequent paragraphs. In Step S206, the central control system 12 generates the operation recommendations of the controllable monitoring points at a regular interval or an irregular interval. The regular interval may be 10 minutes. The central control system 12 may adjust the monitoring data of each controllable monitoring point within a range thereof to provide an operation recommendation for each controllable monitoring point to reduce the coal consumption. For example, if the current amount of the raw materials is 440.5 tons and the range of the raw materials is plus or minus 1 ton per hour, the central control system 12 may increase the operation recommendation for the cement raw material to 441.5 tons, so as to optimize the coal consumption. The range of the monitoring data of each controllable monitoring point may be obtained from empirical values, or calculated from the coal model or other models when a stable operating condition is reached. The other models may be pressure models or temperature models. The stable operating condition may include maintaining the temperature within a temperature range and maintaining the pressure within a pressure range. For example, if the temperature range is between 1200° C. and 1400° C., the central control system 12 may adjust the amount of raw cement materials in the temperature model to determine that the range of the amount of the cement raw materials to be between plus and minus 2 tons per hour in order to maintain the temperature range of between 1200° C. and 1400° C. In some embodiments, if the number of controllable monitoring points is greater than 1, the central control system 12 may set an order of priority for the operation recommendations of the controllable monitoring points, and generate operation recommendations for production equipment according to the order of priority. The operator may set the production equipment using the operation recommendations and according to the order of priority, or the production equipment may operate using the operation recommendations and according to the order of priority. In Step S208, the target operating condition may be a stable operating condition, a reduction in the coal consumption, and/or an increase in production.

Figure 3:
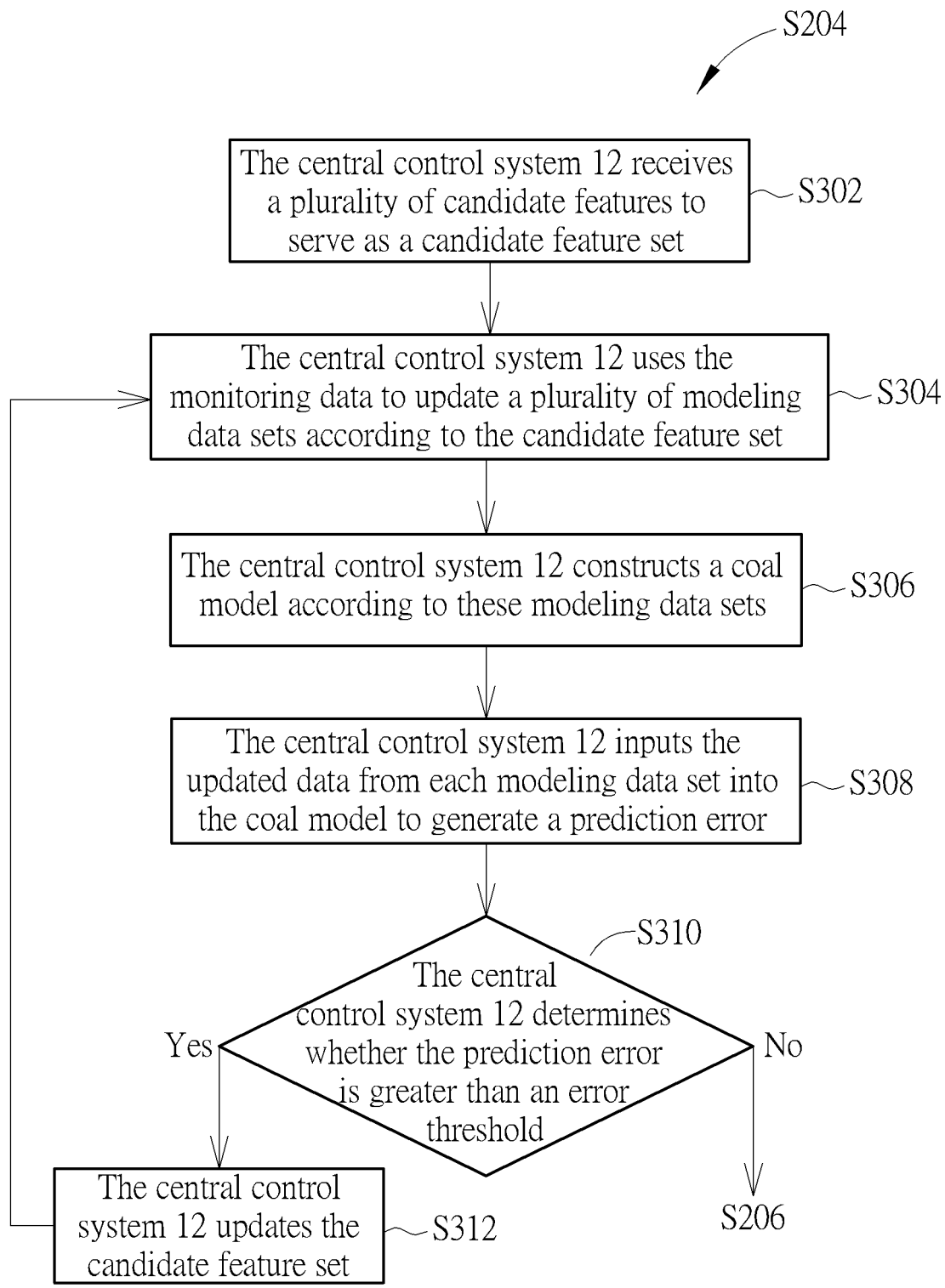
FIG. 3 is a flowchart of Step S204 of the operating method in FIG. 2.

FIG. 3 is a flowchart of Step S204 of the method 200. Step S204 includes Steps S302 to S312. Steps S302 to S306 are used to build a coal model, and Steps S308 to S312 are used to select a candidate feature set. Any reasonable step change or adjustment is within the scope of the disclosure. Steps S302 to S312 are detailed as follows:

Step S302: The central control system 12 receives a plurality of candidate features to serve as a candidate feature set;

Step S304: The central control system 12 uses the monitoring data to update a plurality of modeling data sets according to the candidate feature set;

Step S306: The central control system 12 constructs a coal model according to these modeling data sets;

Step S308: The central control system 12 inputs the updated data from each modeling data set into the coal model to generate a prediction error;

Step S310: The central control system 12 determines whether the prediction error is greater than an error threshold; if so, proceed to Step S312; if not, exit Step S204 and go to Step S206;

Step S312: The central control system 12 updates the candidate feature set.

In Step S302, each candidate feature corresponds to one of the monitoring points 101 to 10N. For example, the amount of cement raw materials may correspond to the raw material feeder; the amount of cement clinker may correspond to a weighing scale at a clinker conveyor; the amount of coal may correspond to the coal feeder; the temperature at the entrance of the calciner may correspond to thermometer at the entrance of the calciner; the speed of the rotary kiln may correspond to the tachometer at the rotary kiln; and the air volume of the cold air fan may correspond to the air volume meter at the cold air fan. In Step S304, each modeling data set corresponds to one of the candidate features, and the central control system 12 may sequentially update the monitoring data of the monitoring points 101 to 10N to the corresponding modeling data set. For example, the central control system 12 may store, in a time sequence, the amounts of all cement raw materials in a first modeling data set, the amount of cement clinker in a second modeling data set; the temperatures at the inlet of all the calciner in a third modeling data set, the rotational speeds of the rotary kiln in a fourth modeling data set, the air volumes of the cold air fan in a fifth modeling data set, and the coal usage in a target coal consumption data set. In Step S306, the central control system 12 trains a coal model according to the modeling data sets and the target coal consumption data set. For example, the central control system 12 may randomly extract the amount of cement raw material, the amount of cement clinker, the temperature at the inlet of the calciner, the rotational speed of the rotary kiln and the air volume supplied by the cool air fan from the first to fifth modeling data sets corresponding to a given point in time, so as to input the same into the coal model to calculate the predicted coal consumption, and adjust a plurality of weights of the coal model to bring the predicted coal consumption closer to the actual coal consumption at the given point in time, thereby constructing the coal model. After the coal model is constructed, the central control system 12 may deliver the operation recommendations corresponding to the priorities of the controllable monitoring points according to the significance levels of the candidate features. The significance level of each candidate feature is related to the weight of the candidate feature in the coal model or an importance score calculated by the coal model. The higher the weight (or the importance score) of the candidate feature is, the higher the priority of the candidate feature will be. If the weight (or the importance score) of the candidate feature is smaller, the priority of the candidate feature is lower. Algorithms for constructing the coal models may include rule-based algorithms, linear/non-linear algorithms, ensemble algorithms, bagging algorithms, and boosting algorithms, adaptive learning algorithms, other machine learning algorithms, or a combination thereof. Step S306 may be implemented by a hierarchical modeling in FIG. 4, or by a restrictive modeling in FIG. 5, and will be explained in detail in the subsequent paragraphs.

In Step S308, the central control system 12 inputs the updated data in each modeling data set into the coal model to generate a predicted coal consumption, and computes a difference between the predicted coal consumption and an updated coal consumption to generate a prediction error. A smaller prediction error indicates an accurate coal model, and the predicted coal consumption predicted by the coal model is close to the actual coal consumption. A larger prediction error indicates a less accurate coal model, and the predicted coal consumption predicted by the coal model deviates from the actual coal consumption. In Step S310, if the prediction error is greater than the error threshold, the candidate feature set will be updated (Step S312) to retrain the coal model; if the prediction error is not greater than the error threshold, there is no need for the candidate feature set to be updated, and the trained coal model is ready to be used in the subsequent procedure. In some embodiments, the central control system 12 may remove a candidate feature from the candidate feature set to update the candidate feature set. In other embodiments, the central control system 12 may update another candidate feature into the candidate feature set, and another candidate feature may correspond to another monitoring point. For example, another candidate feature may be a pressure at the kiln head hood, and another monitoring point may be a pressure meter at the kiln head hood. Another monitoring point may be a monitoring point that has been previously provided at the production equipment but not used, or a monitoring point newly added to the production equipment. For example, vibration sensors may be added to the rotary kiln to increase monitoring points.

Figure 4:
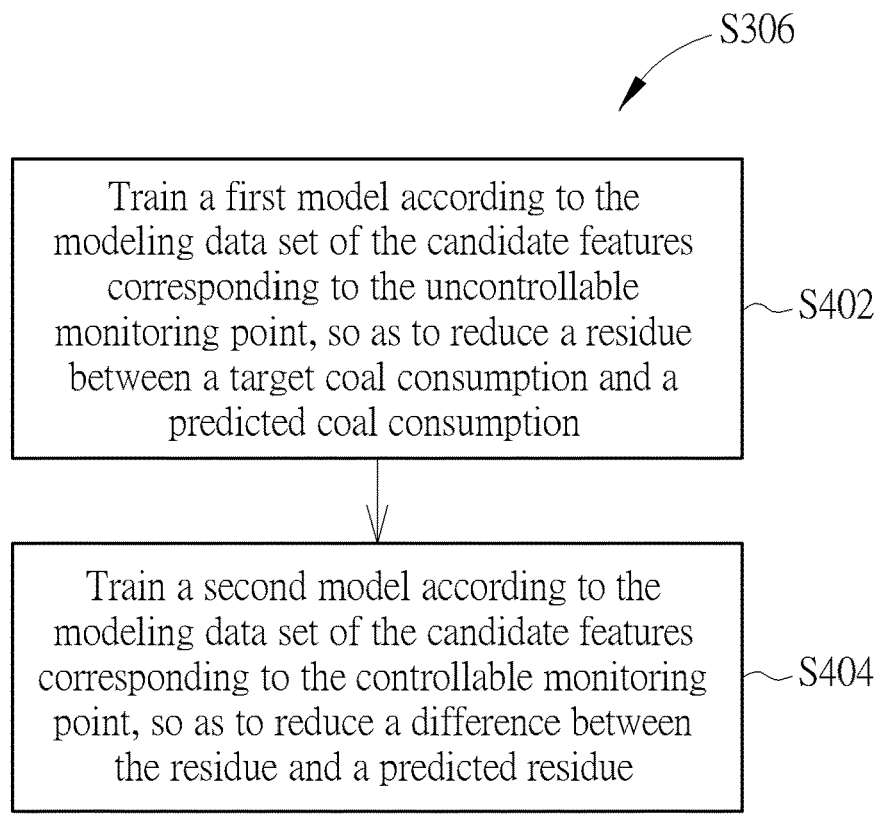
FIG. 4 is a flowchart of Step S306 for modeling in FIG. 3.

FIG. 4 is a flowchart of Step S306 of modeling in FIG. 3. Step S306 includes Steps S402 and S404, and is used to perform a hierarchical modeling to generate a model of coal consumption. Any reasonable step change or adjustment is within the scope of the disclosure. Steps S402 to S404 are detailed as follows:

Step S402: Train a first model according to the modeling data set of the candidate features corresponding to the uncontrollable monitoring point, so as to reduce a residue between a target coal consumption and a predicted coal consumption;

Step S404: Train a second model according to the modeling data set of the candidate features corresponding to the controllable monitoring point, so as to reduce a difference between the residue and a predicted residue.

The coal model generated based on the hierarchical modeling includes the first model and the second model. The first model includes only the candidate features corresponding to uncontrollable monitoring points, and the second model includes only the candidate features corresponding to controllable monitoring points. In Step S402, since the first model only contains the candidate features of the uncontrollable monitoring points, the residue generated by the trained first model has removed the effect of the uncontrollable monitoring points. In Step S404, since the first model only contains the candidate features of the controllable monitoring point, the trained second model may be used to predict the change effect of the controllable monitoring point. In some embodiments, the central control system 12 may adjust the monitoring data of each controllable monitoring point to be within its upper and lower limits, so as to provide the operation recommendation for each controllable monitoring point in a stable operating condition, thereby reducing the predicted coal consumption.

Figure 5:
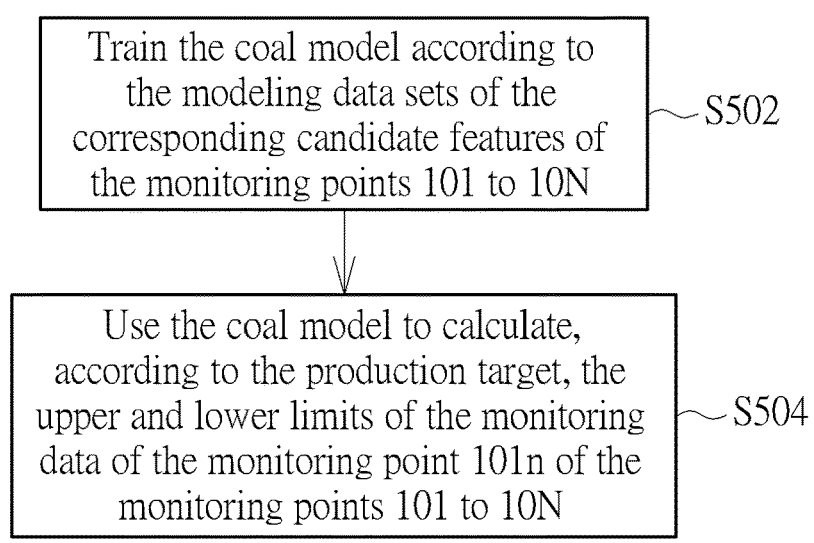
FIG. 5 is a flowchart of Step S306 for modeling in FIG. 3.

FIG. 5 is a flowchart of another flow of Step S306 for modeling. Step S306 includes Step S502 and S504 for generating a coal model using restrictive modeling. Any reasonable step change or adjustment is within the scope of the disclosure. Steps S502 to S504 are detailed as follows:

Step S502: Train the coal model according to the modeling data sets of the corresponding candidate features of the monitoring points 101 to 10N;

Step S504: Use the coal model to calculate, according to the production target, the upper and lower limits of the monitoring data of the monitoring point 101n of the monitoring points 101 to 10N.

In Step S504, the production target is a predetermined production target of cement clinker. The central control system 12 may fix the candidate features of cement clinker to the predetermined production target in the trained coal model, and adjust the monitoring data of each controllable monitoring point to obtain the upper and lower limits of the monitoring data of each controllable monitoring point.

The embodiments in FIGS. 1 to 5 are used to select the candidate feature set and construct the coal model according to the monitoring data of the production equipment, and use the coal model to provide operation recommendations for the production equipment to reduce coal consumption, reducing the operating cost of the cement plant, and reducing carbon emissions, controlling the production equipment in a quick and accurate manner to produce cement clinker without manual intervention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a coal management system, the coal management system comprising a central control system and a plurality of monitoring points, the plurality of monitoring points being disposed at a plurality of pieces of production equipment, the plurality of monitoring points comprising a plurality of controllable monitoring points and a plurality of uncontrollable monitoring points, the method comprising:

the central control system receiving a plurality of candidate features as a candidate feature set, each candidate feature corresponding to one of the plurality of monitoring points;

the monitoring points acquiring monitoring data;

the central control system employing the monitoring data to update a plurality of modeling data sets according to the candidate feature set, each modeling data set corresponding to one of the plurality of candidate features;

the central control system training a first model according to a plurality of modeling data sets corresponding to the plurality of uncontrollable monitoring points, so as to reduce a first difference between a target coal consumption and a predicted coal consumption;

the central control system training a second model according to a plurality of modeling data sets corresponding to the plurality of controllable monitoring points, so as to reduce a second difference between the first difference and a predicted difference;

the central control system generating an operation recommendation for a controllable monitoring point of the plurality of monitoring points according to the first model and the second model; and a piece of production equipment operating according to the operation recommendation to achieve the target operating condition;

wherein the plurality of controllable monitoring points are used to monitor controllable variables including a speed, a volume of air, a current, a voltage and/or a power, the plurality of uncontrollable monitoring points are used to monitor uncontrollable variables including a temperature and/or a pressure, and the uncontrollable variables vary with the controllable variables.

2. The method of claim 1, wherein a candidate feature in the candidate feature set corresponds to the controllable monitoring point;

the method further comprises the central control system delivering the operation recommendation for the controllable monitoring point according to a significance level or a priority of the candidate feature; and the central control system generating the operation recommendation for the controllable monitoring point of the plurality of monitoring points according to the coal model comprises the central control system generating the operation recommendation according to the priority.

3. The method of claim 2, wherein the significance level is related to a weight of the candidate feature in the coal model or an importance score calculated by the coal model.

* * * * *